United States Patent Office 3,305,378
Patented Feb. 21, 1967

3,305,378
COLOR STABILIZED CELLULOSE ESTERS AND COMPOSITIONS CONTAINING NEOPENTYL PHOSPHITE
Kim Ritchie, Ann Arbor, Mich., and John W. Addleburg, Kingsport, Tenn., assignors to Eastman Kodak Company, Rochester, N.Y., a corporation of New Jersey
No Drawing. Filed Feb. 25, 1963, Ser. No. 260,900
10 Claims. (Cl. 106—177)

This invention relates to color stabilized cellulose esters and their compositions which have been stabilized against undesirable color formation by the addition thereto of a neopentyl phosphite.

Cellulose esters as prepared in the conventional manner from wood pulp or cotton linters tend to undergo discoloration and chain cleavage at high temperatures. Also over long periods of time there may be evidence of discoloration of these esters. This is a decided disadvantage in the use of those esters particularly in compositions encountering elevated temperatures such as in molding, fabrics, etc. and consequently considerable attention has been given to the stabilizing of those esters against temperature effects.

One object of our invention is to prepare cellulose esters which retain color and molecular weight stability at temperatures which have in the past caused discoloration therein. Another object of our invention is to provide stabilized cellulose ester compositions containing neopentyl phosphite esters as the color stabilizer alone or with other material. Other objects of our invention will appear herein.

Various materials have been suggested as stabilizers for cellulose esters such as glycidyl ethers, metal salts of weak acids, substituted phenols, etc. Some materials which have been specifically considered in this connection are the mono or diglycidyl ethers of hydroquinone, potassium acid oxalate, strontium naphthenate, resorcinol diglycidyl ether, magnesium or aluminum formate, magnesia, etc. which have been referred to in the art. These color stabilizers either alone or mixed with other materials have been generally effective to prevent molecular weight breakdown but often color formation has not been inhibited to the extent desired.

We have found that cellulose esters may be color stabilized and offer appreciable resistance to color formation if there is contained in the cellulose ester or its compositions a neopentyl phosphite ester having the structural formula:

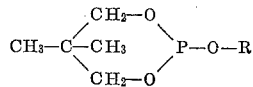

wherein R is alkyl, phenyl or alkylphenyl. We have found that cellulose ester compositions containing at least 0.01 part of neopentyl phosphite ester per 100 parts of cellulose ester have enhanced resistance to color formation on heating. Although the neopentyl phosphites as defined are effective in various concentrations in cellulose esters for imparting resistance to discoloration, a range of 0.01 to 0.5 part (per 100 parts of cellulose ester) is preferred for obtaining cellulose esters of optimum color and molecular weight stability.

It is usually desirable to use the neopentyl phosphites in conjunction with other materials in the preparation of cellulose ester compositions which are to be used in molding operations, in the making of textile materials or for any other purpose particularly where the cellulose ester is liable to be subjected to elevated temperature.

The neopentyl phosphite esters useful as color stabilizers in accordance with our invention are conveniently prepared by means of an ester interchange reaction using triphenyl phosphite or trialkylphenyl phosphite and neopentyl glycol as the starting materials. For instance, paramethylphenyl neopentyl phosphite is conveniently prepared by the following method: 20.8 grams (.1 mole) of neopentyl glycol was mixed with 70.5 grams (0.2 mole) of tricresyl phosphite in a round bottom flask. 0.1 gram of finely divided sodium metal was then added to the mixture at room temperature. The mass was warmed on a water bath for approximately 2 hours with occasional stirring. The flask was then fitted to a vacuum distillation apparatus and the product was distilled under vacuum. The p-methylphenyl neopentyl phosphite formed was collected when using at the range of 120–140° C. distillation temperature and a pressure of 1.7 mm. of mercury.

If the formation of an alkylated neopentyl glycol is desired, for instance decyl neopentyl phosphite, a like procedure is used except that decyl phosphite instead of tricresyl phosphite is the starting material. The product is desirably collected by condensing the distillate resulting from vacuum distillation within the range of 110–140° C. at a pressure of 1.6 mm. of mercury.

If the compound desired is p-tert.-butylphenyl neopentyl phosphite (an alkyl phenyl ester) the product is obtained by separating the p-tert.-butylphenol from the completed reaction mass and saving the residual fraction. Any of the compounds corresponding to the formula given are useful for stabilizing cellulose esters to inhibit color formation in the obtaining of good molecular weight stability.

Example I

Stabilizers were incorporated into cellulose esters in forming compositions thereof by the conventional melting techniques and the compositions resulting were evaluated for color and molecular weight stability by two methods as follows:

(1) *Determination of heat test color.*—This test was run by heating the composition in a glass test tube for one hour at 205° C. and determining the amount of coloration of the resulting composition, the higher the number the more discoloration.

(2) *Determination of roll color.*—This test was run using a Gardner Color Difference Meter on pressed plates prepared from a plastic composition formed by a milling procedure in which the ingredients are mixed together. Compositions were prepared from cellulose acetate butyrate with and without phosphites in accordance with the invention by intimately mixing the ingredients together. These compositions were tested by the methods described. The cellulose acetate butyrate used containing 38% butyryl was a conventional type used for molding compositions. The compositions prepared and the test results obtained were as follows:

TABLE I.—EVALUATION OF STABILIZED CELLULOSE ACETATE BUTYRATE COMPOSITIONS BY HEAT TEST COLOR, ROLL COLOR AND MEASUREMENTS

| Sample | Parts | Parts | Parts |
|---|---|---|---|
| Cellulose acetate butyrate | 100 | 100 | 100 |
| Dibutyl Sebacate | 5 | 5 | 5 |
| Strontium naphthenate | 0.037 | 0.037 | 0.037 |
| Epoxidized soybean oil | 1.0 | 1.0 | 1.0 |
| Neopentyl Phenyl Phosphite | 0.1 | None | None |
| Neopentyl Decyl Phosphite | None | None | 0.1 |
| Roll Color | 10.6 | 11.0 | 10.5 |
| 1 Hour Heat Test Color at 205° C | 5 | 10+ | 5+ |

Example II

Compositions were prepared from cellulose acetate propionate having a propionyl content of approximately 48% in which the cellulose ester was compounded with plasticizer, stabilizers and neopentyl phenyl phosphite. The compositions were prepared by hot rolling the cellulose ester with the plasticizer and the various additives. Testing of the compositions with and without neopentyl phosphite therein showed increased color stability as a result of adding phosphite stabilizer.

TABLE II.—EVALUATION OF STABILIZED CELLULOSE ACETATE PROPIONATE BY HEAT TEST COLOR AND ROLL COLOR MEASUREMENTS

| Sample | Parts | Parts |
|---|---|---|
| Cellulose acetate propionate | 100 | 100 |
| Dibutyl Sebacate | 12.5 | 12.5 |
| Strontium naphthenate | 0.025 | 0.025 |
| Epoxidized soybean oil | 1.0 | 1.0 |
| Neopentyl Phenyl Phosphite | None | 0.1 |
| Roll Color | 11.2 | 10.8 |
| 1 Hour Heat Test Color at 205° C | 10+ | 5 |

The phosphite in accordance with our invention is particularly useful for the color stabilizing of cellulose acetate butyrates and cellulose acetate propionates but any of the lower fatty acid esters of cellulose, i.e. of fatty acids of 2 to 4 carbon atoms will be color stabilized by adding thereto a phosphite as defined herein.

If the neopentyl phosphite used is an alkyl ester or an alkyl phenyl ester the number of carbon atoms of the alkyl is not critical. Ordinarily the R substituent of the neopentyl phosphite is conveniently within the range of 6–12 carbon atoms.

We claim:
1. A lower fatty acid ester of cellulose containing therein a color stabilizing amount of a neopentyl phosphite having the formula

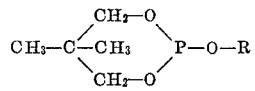

wherein R is a radical selected from the group consisting of alkyl and phenyl.

2. Cellulose acetate butyrate containing a color stabilizing amount of a neopentyl phosphite having the formula

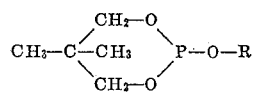

wherein R is a radical selected from the group consisting of alkyl and phenyl.

3. Cellulose acetate propionate containing a color stabilizing amount of a neopentyl phosphite having the formula

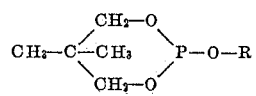

wherein R is a radical selected from the group consisting of alkyl and phenyl.

4. Cellulose acetate butyrate containing neopentyl phenyl phosphite.

5. Cellulose acetate butyrate containing neopentyl decyl phosphite.

6. Cellulose acetate propionate containing neopentyl phenyl phosphite.

7. A composition resistant to the effects of heat comprising a plasticized lower fatty acid ester of cellulose containing a plurality of materials including as a color stabilizer a neopentyl phosphite ester selected from the group consisting of neopentyl alkyl phosphite and neopentyl phenyl phosphite.

8. A cellulose acetate butyrate molding composition containing plasticizer, strontium naphthenate, epoxidized soybean oil and neopentyl phenyl phosphite.

9. Cellulose acetate propionate molding composition containing plasticizer, strontium naphthenate, epoxidized soybean oil and neopentyl phenyl phosphite.

10. A lower fatty acid ester of cellulose containing therein 0.01 to 0.5% by weight of said ester of neopentyl phosphite having the formula

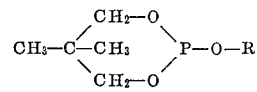

wherein R is a radical selected from the group consisting of alkyl and phenyl.

References Cited by the Examiner
UNITED STATES PATENTS

| | | | |
|---|---|---|---|
| 2,834,798 | 5/1958 | Hechenbleikner et al. | 260—45.8 XR |
| 2,916,508 | 12/1959 | McConnel | 260—45.8 XR |
| 2,980,643 | 4/1961 | Edelman et al. | 260—45.8 XR |
| 2,999,398 | 8/1961 | Kronstein et al. | 106—177 XR |
| 3,031,489 | 4/1962 | Birum et al. | 106—177 XR |
| 3,056,824 | 10/1962 | Hecker et al. | 260—45.8 XR |
| 3,089,893 | 5/1963 | Dever | 107—177 XR |
| 3,133,043 | 12/1964 | Rosenfelder et al. | 260—45.8 XR |
| 3,159,591 | 12/1964 | Lanham | 260—45.8 XR |

OTHER REFERENCES

"PVC Technology," 1962, by Penn, Maclaren & Sons, Ltd., London, p. 145.

ALEXANDER H. BRODMERKEL, *Primary Examiner.*

J. H. WOO, *Assistant Examiner.*